United States Patent
Lyren

(10) Patent No.: US 10,834,520 B2
(45) Date of Patent: *Nov. 10, 2020

(54) SWITCHING BINAURAL SOUND FROM HEAD MOVEMENTS

(71) Applicant: Philip Scott Lyren, Bangkok (TH)

(72) Inventor: Philip Scott Lyren, Bangkok (TH)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,174

(22) Filed: Mar. 21, 2020

(65) Prior Publication Data

US 2020/0245093 A1 Jul. 30, 2020

Related U.S. Application Data

(63) Continuation of application No. 16/258,601, filed on Jan. 27, 2019, now Pat. No. 10,602,300.

(51) Int. Cl.
| | |
|---|---|
| *H04S 7/00* | (2006.01) |
| *H04R 5/033* | (2006.01) |
| *H04R 5/04* | (2006.01) |
| *G06F 3/01* | (2006.01) |

(52) U.S. Cl.
CPC .............. *H04S 7/304* (2013.01); *G06F 3/012* (2013.01); *H04R 5/033* (2013.01); *H04R 5/04* (2013.01); *H04S 2420/01* (2013.01)

(58) Field of Classification Search
CPC ..... H04S 2420/01; H04S 7/304; H04R 5/033; H04R 5/04; G06F 3/012
See application file for complete search history.

(56) References Cited

U.S. PATENT DOCUMENTS

| | | | |
|---|---|---|---|
| 10,602,300 B1* | 3/2020 | Lyren | H04S 7/304 |
| 2017/0359467 A1* | 12/2017 | Norris | G06F 3/165 |
| 2018/0343534 A1* | 11/2018 | Norris | H04N 5/232 |

* cited by examiner

*Primary Examiner* — Regina N Holder

(57) ABSTRACT

A method or apparatus switches between binaural sound and stereo sound in response to head movements of a listener. An electronic device provides the listener with binaural sound at a sound localization point (SLP) in a field-of-view of the listener. Binaural sound at the SLP switches to one of mono or stereo sound when head movements of the listener cause the SLP to move outside the field-of-view.

20 Claims, 11 Drawing Sheets

Provide sound to a listener in a format of binaural, stereo, or mono sound.
300

Switch sound?
310

No

Yes

Provide a warning to the listener.
320

SWITCHING BINAURAL SOUND FROM HEAD MOVEMENTS

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Figure 1:
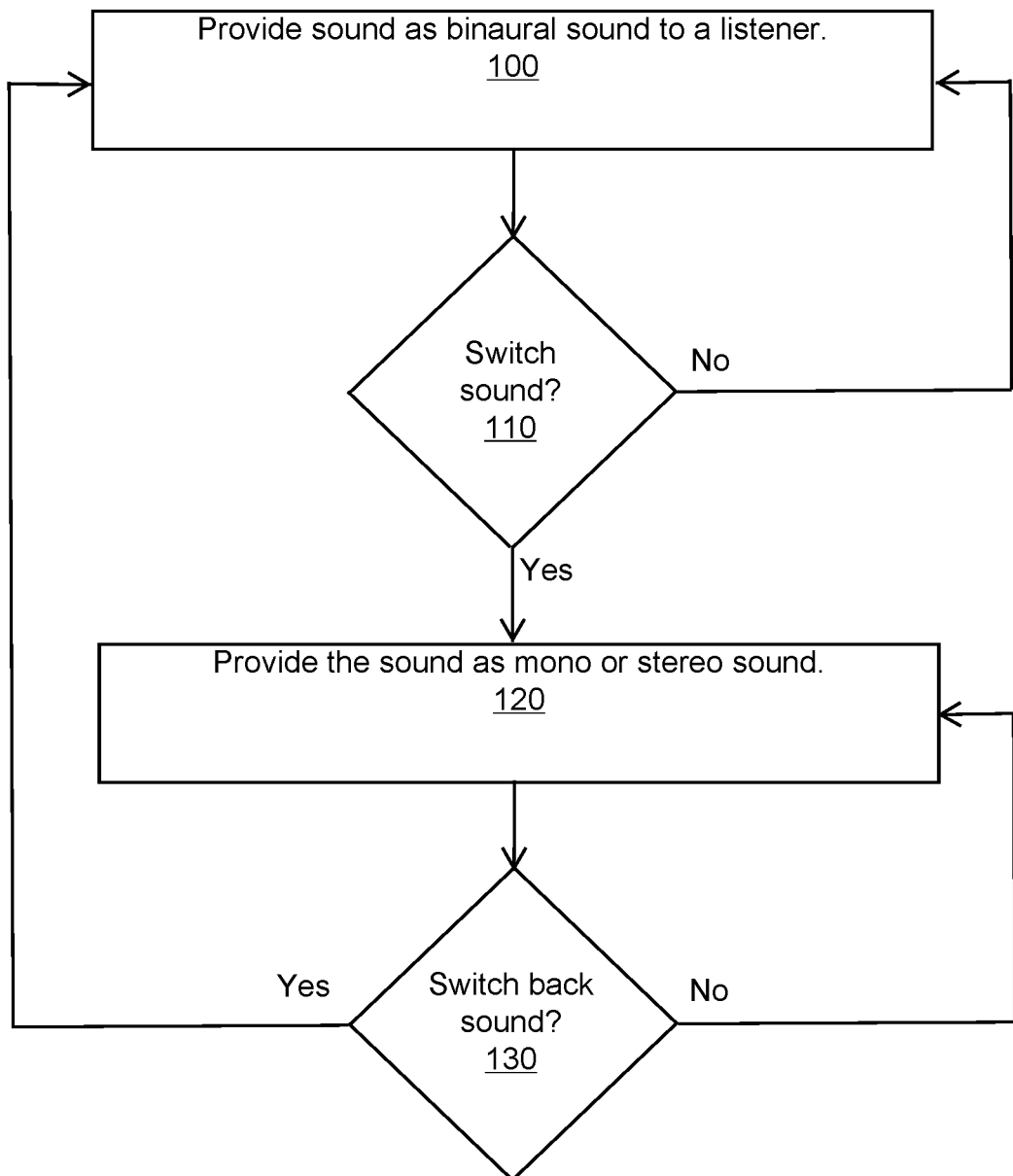
FIG. 1 is a method that switches to and from binaural sound and mono or stereo sound in accordance with an example embodiment.

Example embodiments include methods and apparatus that switch between binaural sound and mono or stereo sound.

One example embodiment is a method that switches from binaural sound to one of mono sound or stereo sound in response to head movements of a listener. The method provides the listener with binaural sound at a sound localization point (SLP) in a field-of-view of the listener. Binaural sound at the SLP switches to one of mono or stereo sound when head movements of the listener cause the SLP to move outside the field-of-view.

Other example embodiments are discussed herein.

DETAILED DESCRIPTION

Binaural sound or three-dimensional (3D) sound externally localizes away from a head of the listener, unlike stereo or mono sound that localizes inside the head of the listener or localizes to a physical sound speaker. Thus, when a listener hears binaural sound, a source or location of the sound occurs outside the head of the listener even though this location may be in empty space or space not occupied with a physical sound speaker or loud speaker.

Binaural sound has many technical challenges and problems, especially when users exchange binaural sound in an electronic communication or play binaural sound in an augmented reality (AR) or virtual reality (VR) environment. Example embodiments offer solutions to these challenges and problems.

Problems occur during an electronic communication and AR and VR environments when listeners move their heads while listening to binaural or three-dimensional (3D) sound.

As one example, when the head of the listener moves with respect to a sound localization point (SLP) of binaural sound, the sound must be repeatedly processed or convolved in order for the listener to continue to hear the sound as originating from the SLP. Maintaining binaural sound at the SLP while the listener moves his or her head is a process intensive task. If the processor cannot process the sound fast enough, then the SLP can unexpectedly move and create confusion or an unrealistic audio environment.

As another example, processing binaural sound to have accurate and consistent SLPs behind the listener is challenging. A precise location or origin of a sound source is more difficult to determine when this sound source occurs behind the head of the listener. This difficulty occurs, in part, because the listener is unable to see the sound source and must rely on hearing to determine the SLP or the location of the sound source. By contrast, when the sound source occurs in front of the listener, such as in the field-ofview (FOV), the listener can determine a location of this sound source based on both visual and audio information (e.g., the listener can both see and hear the sound source).

Example embodiments solve these problems and others. These example embodiments include methods and apparatus that switch or change a format of how sound is provided to the listener (e.g., mono, stereo, and binaural sound) based on changes to head movements and/or to a field-of-view of the listener. For example, one example provides the listener with binaural sound at a sound localization point (SLP) in a field-of-view of the listener. Binaural sound at the SLP switches to one of mono or stereo sound when head movements of the listener cause the SLP to move outside the field-of-view. The mono or stereo sound switches back to binaural sound when the head movements of the listener cause the SLP to move back inside the field-of-view. In this way, the binaural sound is maintained in the field-of-view of the listener and switched to another format when the SLP is no longer visible or in the field-of-view. These movements of the SLP can also occur when the SLP itself moves (e.g., an image in the FOV of the listener moves outside the FOV).

FIG. 1 is a method that switches to and from binaural sound and mono or stereo sound in accordance with an example embodiment.

Block 100 states provide sound as binaural sound to a listener.

Binaural sound is provided to the listener through one or more electronic devices including, but not limited to, one or more of headphones, earphones, earbuds, bone conduction devices, or other electronic devices with speakers at, in, or near the ears of the listener. Binaural sound can be processed for crosstalk cancellation and provided through speakers separate or away from the listener (e.g., dipole stereo speakers). Electronic devices in communication with or formed as part of headphones, earphones, and earbuds can provide binaural sound to the listener (e.g., a smartphone in wireless communication with earphones).

Various types of electronic devices can include or be in communication with speakers to provide binaural sound to listeners. Examples of these electronic devices include, but are not limited to, wearable electronic glasses, smartphones, head mounted displays (HMDs), optical head mounted displays (OHMDs), wearable electronic devices (WEDs), portable electronic devices (PEDs), handheld portable electronic devices (HPEDs), laptop computers, tablet computers, desktop computers, and other electronic devices.

From the point-of-view of the listener, the sound originates or emanates from an object, point, area, or direction. This location for the origin of the sound is the sound localization point (SLP). By way of example, the SLP can be an actual point in space (e.g., an empty point in space 1-2 meters away from the head of the listener) or a point on or at a physical or virtual object (e.g., a mouth or head of an augmented reality (AR) or virtual reality (VR) image). The SLP does not have to be so precise since humans are not always able to localize sound to a particle point. As such, the SLP can also be a specific or general area (e.g., a location next to and on the right side of the listener) or a specific or general direction from where the sound originates to the listener (e.g., a location several meters behind the listener).

When binaural sound is provided to the listener, the listener will hear the sound as if it originates from the sound source, the source of sound, or the SLP. The sound, however, does not originate from the sound source since the sound source or SLP may be an inanimate object with no electronics or an animate object with no electronics. Alternatively, the sound source or SLP has electronics but does not have the capability to generate sound (e.g., the sound source has no speakers or sound system). As yet another example, the sound source or SLP has speakers and the ability to provide sound but is not providing sound to the listener. In each of these examples, the listener perceives the sound to originate from the sound source or SLP, but the sound source or SLP does not produce the sound. Instead, the sound is processed or convolved and provided to the listener so the sound appears to originate from the sound source or SLP.

Consider an example in which the sound externally localizes away from the head of the listener in empty space (e.g., where no physical or tangible object exists) or occupied space. For example, the sound externally localizes proximate or near the listener, such as localizing within a few meters of the listener. For instance, the SLP where the listener localizes the sound is stationary or fixed in space (e.g., fixed in space with respect to the user, fixed in space with respect to an object in a room, fixed in space with respect to an electronic device, fixed in space with respect to another object or person).

By way of example, the SLP can be an actual point in space (e.g., an empty point in space 1-2 meters away from the head of the listener) or a point on a physical or virtual object (e.g., a mouth or head of an augmented reality (AR) or virtual reality (VR) image). The SLP does not have to be so precise since humans are not always able to localize sound to a particle point. As such, the SLP can also be a general area (e.g., a location next to and on the right side of the listener) or a general direction from where the sound originates to the listener (e.g., a location several meters behind the listener).

Block 110 makes a determination whether to switch the sound from binaural sound to mono or stereo sound.

If the answer to this determination is "no" then flow proceeds back to block 100.

If the answer to this determination is "yes" then flow proceeds to block 120 that states provide the sound as mono or stereo sound.

The sound being provided to the listener can switch or change between binaural, stereo, and mono sound. Further, the listener, a user, an electronic device, a process, or a software program can make this determination and initiate the switching of the sound from one format (e.g., binaural) to another format (e.g., stereo or mono).

Block 130 makes a determination whether to switch back the sound to binaural sound.

If the answer to this determination is "no" then flow proceeds back to block 120, and the sound continues to play as mono or stereo sound.

If the answer to this determination is "yes" then flow proceeds back to block 100, and the sound switches to play as the binaural sound.

By way of example, a determination to switch the sound includes, but is not limited to, one or more of the following: an instruction or command from a user or listener (e.g., the listener interacts with a user interface to switch the sound), a sensor sensing of an action (e.g., a sensor senses a user donning headphones or wearable electronic device), activation of a physical or virtual switch (e.g., a switch toggles, activates, or moves to switch the sound), head tracking activates switching (e.g., switch when the listener moves his or her head a certain amount or to a certain view), a user interface receives a voice command to switch the sound, a timer or clock initiates switching (e.g., switch at a certain time of day), a global positioning system (GPS) or Internet of Things (IoT) location activates switching (e.g., switch the sound when the listener enters a predetermined area or location), user preferences indicate a switch (e.g., memory stores a user's preference to hear telephone calls in stereo but software games in 3D sound), a user agent initiates switching, a software program causes switching (e.g., while playing a software game a user takes an action that causes the game to switch sound), bandwidth availability (e.g., switch to stereo or mono when bandwidth drops to a predetermined level), processing resources availability or consumption (e.g., switch to stereo or mono when processing resources exceeds a predetermined level), and other examples discussed herein.

Consider an example in which an electronic device tracks eye movement, focus, or gaze of the listener. The sound being provided to the listener switches based on the eye movements or gaze. For example, switching of the sound occurs when eyes of the listener focus on a particular object or area. As another example, switching of the sound occurs when the eyes of the listener close or open for a predetermined amounted of time. For instance, a camera captures images of the face of the listener, and facial recognition software or eye tracking software categorizes the eyes as being open or closed. When the eyes are closed for a predetermined amount of time, the sound automatically switches (e.g., switches from binaural sound to stereo or mono sound). Such switching occurs while the listener continues to hear the sound uninterrupted.

Figure 2:
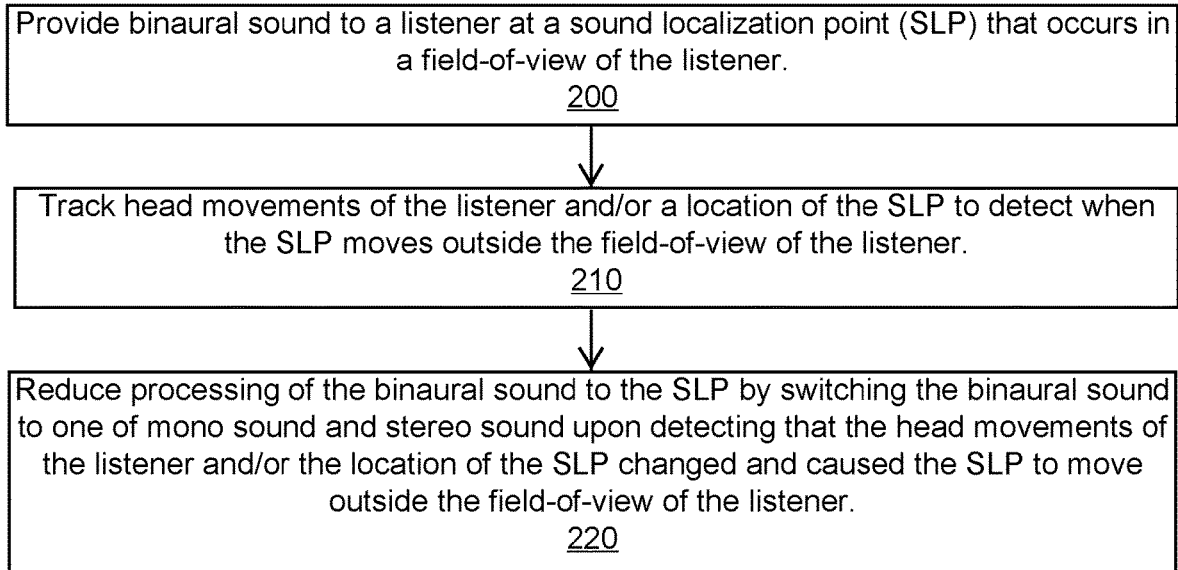
FIG. 2 is a method that reduces processing of binaural sound to a sound localization point (SLP) in accordance with an example embodiment.

FIG. 2 is a method that reduces processing of binaural sound to a sound localization point (SLP) in accordance with an example embodiment.

Block 200 states provide binaural sound to a listener at a sound localization point (SLP) that occurs in a field-of-view of the listener.

One or more processors process and/or convolve the sound so the sound originates or emanates to the listener from a SLP that is in the field-of-view (FOV) of the listener. This SLP can include an image (such as a 2D or 3D image), a picture, video, text, symbol, graphical representation, icon, emoji, etc. The SLP can also occur in empty space where no physical or tangible object resides.

As noted, the sound can be provided to the listener through various types of electronic devices, such as headphones, earphones, speakers, etc.

Consider an example in which the two users communicate with each other while wearing head mounted displays or wearable electronic devices. These electronic devices execute software that enables voice exchanges between the two users. The voice of the second user originates to the first user from a SLP that includes an image representing the second user. In this way, the first user sees the second user and also hears the voice originating from this image. The image and thus SLP are in the field-of-view of the first user since the first user sees the image from where the sound emanates.

Block 210 states track head movements of the listener and/or a location of the SLP to detect when the SLP moves outside the field-of-view of the listener.

An example embodiment executes head tracking to track head movement of the listener while the listener listens to the sound. Head tracking monitors or tracks head position and/or orientation of the head of the listener. Various methods and electronics can be used to track head movement. By way of example, such electronics include, but are not limited to, one or more of accelerometers, gyroscopes, magnetometers, cameras, and infrared LEDs.

An example embodiment also tracks a location of the SLP and/or an object associated with the SLP. For example, the SLP occurs at a coordinate location associated with the coordinates of the HRTFs convolving or processing the sound being provided to the listener. As another example, SLP occurs at a coordinate location on or thru a display that includes an object at the SLP. For instance, the SLP is or includes a talking graphical representation, such as a talking emoji, animoji, emoticon, person, character, image, etc. As yet another example, the SLP can occur at a location of a physical or tangible object, such as sound externally localizing to a physical object proximate to the listener.

Consider an example in the listener wears a head mounted display, electronic glasses, or other wearable electronic device that displays a field-of-view to the listener. Initially, the SLP occurs in this field-of-view. For example, the wearable electronic device includes a display or displays an image or graphical representation with or at the SLP. This SLP and graphical representation can remain at a fixed location in this field-of-view such that head movements of the listener cause the SLP and graphical representation to leave the field-of-view of the listener. For instance, the SLP and graphical representation are visible since they appear within several meters in front of the listener. When the listener turns or rotates her head 180° (e.g., turning to look behind her), the field-of-view no longer includes the location of the SLP and graphical representation. Further, the SLP and graphical representation can move even though the head of the listener remains fixed or stationary. For instance, while a head of the listener remains motionless in a forward-looking direction, the SLP and accompanying graphical representation disappear and are no longer visible to the listener (e.g., they move behind the listener or off to one side).

Humans have a visual field that includes about 210° per a forward-facing horizontal range and about 150° in the vertical range. Further, the ability to perceive or to identify shape and motion across the visual field varies.

Example embodiments are not limited to executing within a full field-of-view or visual field of the listener but include subsets or smaller areas within the field-of-view or visual field. For example, a listener may have a field-of-view that extends 180° horizontally and 150° vertically, but a subset of this FOV is limited to 120° horizontally and 90° vertically. Example embodiments can execute in such subsets. For example, the listener moves his or her head, and this movement causes the SLP to move outside the subset of the FOV or visual field but remains in the full FOV. Movement of the SLP outside the subset of the FOV initiates a switch or change in sound as discussed herein.

An example embodiment tracks the location of the SLP based on coordinate locations derived from the head movements and/or the SLP, which can be fixed with respect to the listener or moving. The SLP can also be provided with a coordinate location (e.g., based on or derived from HRTFs processing the sound). Pixel locations from a display also provide coordinate or location information (e.g., a location or area on the display where the graphical representation and SLP are provided to the listener).

Block 220 states reduce processing of the binaural sound to the SLP by switching the binaural sound to one of mono sound and stereo sound upon detecting that the head movements of the listener and/or the location of the SLP changed and caused the SLP to move outside the field-of-view of the listener.

Processing or convolving binaural sound and then providing this binaural sound to the listener is more process intensive than providing mono or stereo sound to the listener. This difference becomes exacerbated when the listener moves his or her head and/or the SLP moves with respect to the listener since the sound is continually processed to emanate from the SLP. Example embodiments reduce this processing or convolution and hence free-up processing resources by switching the binaural sound to mono or stereo sound.

Switching the sound from binaural sound to mono or stereo sound and switching the sound from mono or stereo sound to binaural sound also provides a mechanism for informing the listener of the current location of the SLP. For example, when the switch occurs from binaural sound to stereo sound, this switch audibly informs the listener that the location of the sound is no longer in the field-of-view or visual field. This switch could have occurred, for example, if the SLP or object from which the sound emanates moved and/or the head of the listener moved.

Consider an example in which the listener wears an HMD while playing a VR card game or another game in a virtual environment. In this virtual environment, for example, the listener sits at a blackjack or poker table with other people also present at the table (e.g., a dealer and other players). Voice of these other people externally localize to the listener as binaural sound to the respective images seated around the table. While the table and/or people remain in the field-of-view of the listener, the voices continue to externally localize as binaural sound. Processing the voices to these locations is process intensive, especially since the listener moves his or her head while seated at the table playing the game. The listener then turns his or her head such that the table and/or the other people are no longer in the field-of-view of the listener. This movement causes the binaural sound to switch to stereo sound. The listener still hears the voices of the people (or other sounds associated with the game), but these sounds are now provided in stereo sound, not binaural sound. While the table and/or people remain out of the field-of-view of the listener, the sound continues to be provided to the listener in stereo sound. When the listener moves his or her head such that the table and/or people re-appear in the field-of-view, the sound switches from stereo sound back to binaural sound.

Consider further the above example of the listener play a VR card game. While the listener is seated at the table and viewing the other players, voices of the other players externally localize as binaural sound to the respective images of the players. During the game, one player (e.g., Player A) decides to take a break. Player A stands up and walks to another part of the virtual environment or temporarily leaves the virtual environment. In response to this movement, the voice of Player A switches from binaural sound that previously localized to the image of Player A to stereo sound that now localizes inside the head of the listener. Switching saves processing resources and further signifies to the listener that Player A is no longer in the current field-of-view of the listener.

In the above example of the listener playing a VR card game, switching the sound performs two tasks. First, switching from binaural sound to stereo sound reduces processing resources required to provide the sound to the listener. This occurs while the head or sight of the listener is not directed to the card table and/or other people. Or, this situation occurs when a SLP (here, one of the players) moves away from the table and outside the FOV of the listener. During this time, the listener continues to hear the sounds of the game (including the voice of the other people), but these sounds occur in stereo. Second, switching between binaural and stereo sounds notifies the listener that the people are no longer within the field-of-view of the listener. The listener knows or learns that sound externally localizes as binaural sound to objects (such as the people at the card game) when these objects are within the field-of-view (or a subset of this FOV). By contrast, when an object moves outside this field-of-view, the sound switches to or is provided in stereo sound. In this way, the format of the sound alone (e.g., binaural or stereo) informs the listener of a location of the object. For example, when the listener hears the voice of a person in stereo sound, then the listener knows that this person is not presently in a field-of-view of the listener. This information, for instance, could prompt the listener to turn his or her head to locate the person.

Head movements of the listener and/or movements of the SLP can cause other actions to occur. For example, one or both of these actions cause the volume of the sound or intensity of sound to reduce. For instance, the volume reduces a voice of a person emanating from the SLP in response to detecting that head movements of the listener and/or movements of the SLP caused the SLP to move outside the field-of-view of the listener. This reduction in volume of sound notifies or alerts the listener that the SLP moved outside the field-of-view of the listener.

Conventionally, a reduction in the volume occurs when a distance between the listener and the source of the sound decrease (i.e., sound intensity level decreases with a ratio of 1/r to the distance). By contrast, with an example embodiment, a reduction in volume of sound occurs even when the relative distance (r) between the listener and the source of sound does not change. For example, the listener plays an AR or VR software game in which the listener views an image of talking person two meters away directly in front of the listener. When the listener rotates his or her head to the left or right, the listener no longer can see the image of the talking person. This action causes the sound to switch to stereo sound and the volume of the sound to reduce. The reduction in volume of the sound occurred even though the distance between the listener and the source of sound (here the image located two meters away) remained constant. The reduction in the volume of the sound was provided instead to notify the listener that the image of the talking person was no longer in the field-of-view of the listener.

An intensity of the sound decreases an amount sufficient to be perceivable to the listener so as to notify him or her of the change to the SLP. For example, the amount of reduction is based on a percentage of the current sound level being provided to the listener. For instance, an example embodiment reduces the sound by 10%, 20%, 30%, 40%, or 50% of its current intensity or volume.

Consider an example in which the SLP occurs within an area or a boundary within a physical or real environment, an AR environment, or a VR environment. For example, this area is defined according a geographical shape that occurs in 2D or 3D space (e.g., a circle, sphere, oval, square, etc.). As another example, this area is defined according a VR or AR image or location (e.g., a VR room or VR space). As yet another example, this area is defined according to a perimeter or boundary of a display. For instance, a perimeter or edge of AR glasses or HMD define an area in which the SLP occurs. As another example, a display shows the area with a visibly perceivable indication (e.g., with the use of color, shading, brightness, words, symbols, etc.). When the SLP and/or its coordinate location moves outside of this area or boundary, then an example embodiment executes a switch from binaural sound to stereo sound or from stereo sound to binaural sound.

By way of example, an example embodiment defines an area inside an outer perimeter (e.g., a perimeter of a display, a FOV, or an object). A coordinate location of the SLP occurs inside or within the perimeter. When movements of the head of the listener and/or the SLP cause the coordinate location of the SLP to move outside the perimeter, then this action executes switching of the sound from being provided to the listener as binaural sound to being provided to the listener as stereo sound or mono sound.

Consider an example in which a user wears electronic glasses that display an AR image of a talking person located on a physical chair in front of the listener. An edge or perimeter of the glasses defines a field-of-view of the listener. A voice of the talking person emanates from the image and represents the SLP to the listener. The glasses include a camera that captures an image of the chair, and object recognition software tracks the location of the chair in order to maintain the AR image of the talking person at this location. When the head of the listener sufficiently rotates in one or more directions, the chair and accompanying AR image are no longer visible in the FOV thru the glasses. Here, the SLP moved outside the perimeter of the FOV. In response to detecting this occurrence, software providing the sound switches the voice of the talking person from binaural sound that localizes at the location of the chair to stereo sound that localizes inside the head of the listener. When the head of the listener rotates back so that the chair is within the FOV, the software switches the voice of the talking person back to binaural sound that externally localizes to the AR image at the chair.

As noted, switching sound in this manner saves processing resources and notifies the listener that the SLP is no longer in the FOV. Additionally, this switching mitigates the need to localize sound to a location that is behind the listener or not in the FOV of the listener. Localizing binaural sound to such locations can be difficult since the origin of the sound and accompanying image occur outside the FOV.

Consider an example in which a SLP and accompanying image occur directly in front of a face of a person along a forward-looking line of sight. This line of sight extends as a straight line from the listener's eyes to the SLP and image. A location of the SLP and image along the line of sight define a coordinate location (e.g., with polar or spherical coordinates). Head tracking and/or object recognition software enables an example embodiment to determine how much a coordinate location of the SLP moves with respect to a line-of-sight of the listener while the head of the listener moves. When movement of the coordinate location of the SLP with respect to the line-of-sight exceeds a threshold, then sound switches from binaural sound to stereo sound or from stereo sound to binaural sound. This switching can occur even if the SLP remains in the FOV of the listener.

Consider further this example in which the SLP is directly in front of the listener along the forward-looking line of sight. For example, a location of the SLP is 1.5 meters away and hence has spherical coordinates of (1.5 m, 0, 0). An example embodiment is set to execute switching of sound when a head of the listener rotates more than a threshold amount (e.g., 49° in the azimuth direction). A head of the listener rotates along the horizontal plane or azimuth direction by 50° toward a right side of the listener. Here, the distance (1.5 m) and elevation angle (0) remain unchanged, but the azimuth angle changed by fifty degrees, which is larger than the threshold amount. Since this change in azimuth angle of fifty degrees exceeded the threshold value, the example embodiment switches the sound from playing as the binaural sound to playing as the stereo sound. This change occurs even though the SLP is still within the FOV of the listener. This change notifies to the listener that the SLP is no longer in a predetermined range of the line of sight.

Switching sound in this manner enables the listener to control which sounds are provided in binaural sound and which sounds are provided in stereo sound. This listener is thus able to switch how he or she hears the sound based on head movements (e.g., based on an amount and/or direction of head movement).

Consider an example in which the listener simultaneously talks to three different images of people A, B, and C who are located 2 meters in front of the listener. A is located at (2.0 m, −45°, 0); B is located at (2.0 m, 0, 0); and C is located at (2.0 m, 45°, 0). All three images simultaneously occur within the FOV of the listener. When the listener rotates his or her head to look directly at A, the voice of A occurs in binaural sound while the voices of B and C occur in stereo sound. When the listener rotates his or her head to look directly at C, then the voice of C occurs in binaural sound while the voices of A and B occur in stereo sound.

An example embodiment switches sound when a line-of-sight of the listener moves more than or equal to threshold amount or predetermined amount. For example, change or switch the sound from binaural to stereo or from stereo to binaural upon detecting or determining that the line-of-sight of the listener moves more than a predetermined amount in the azimuth and/or elevation direction. Examples of predetermined amounts include, but are not limited to, 10°, 20°, 30°, 40°, 50°, 60°, 70°, 80°, 90°, . . . 180°.

An example embodiment switches sound when a line-of-sight of the listener moves more than or equal to a specific direction. For example, change or switch the sound from binaural to stereo or from stereo to binaural upon detecting or determining that the line-of-sight of the listener moves with a certain compass heading.

Consider an example of a wearable electronic device with a display that displays an image of a person at an SLP that remains at a fixed location to the listener while a head of the listener moves. One or more processors execute instructions to determine when the image of the person is no longer being displayed in the field-of-view of the listener and to change the sound from playing in the binaural sound to playing in the stereo sound.

Figure 3:
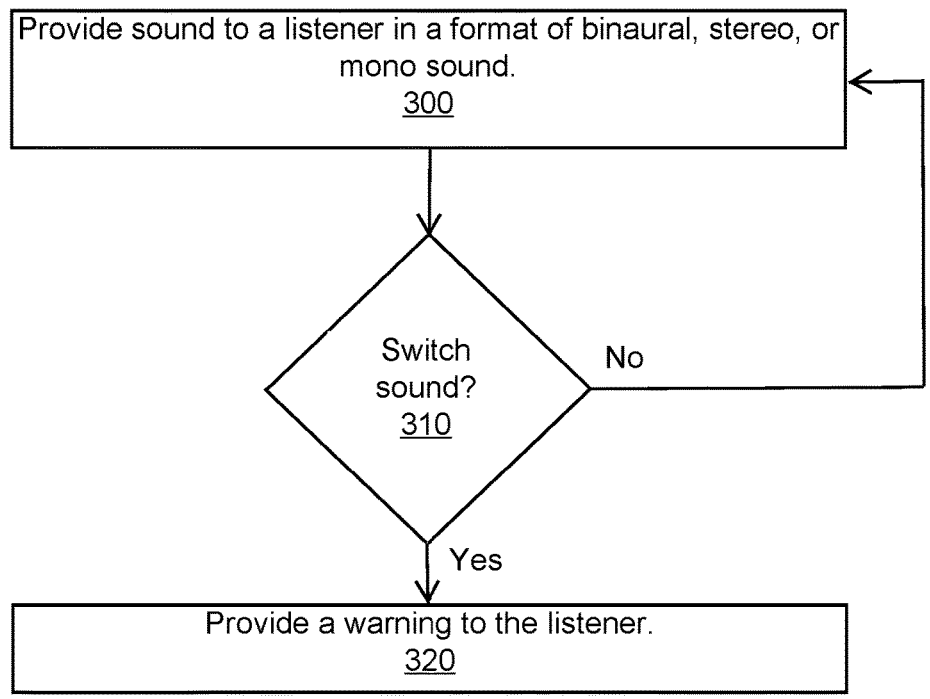
FIG. 3 is a method to warn a listener when sound will switch format in accordance with an example embodiment.

FIG. 3 is a method to warn a listener when sound will switch format in accordance with an example embodiment.

Block 300 states provide sound to a listener in a format of binaural, stereo, or mono sound.

As noted herein, headphones, earphones, HMDs, wearable electronic devices, and other electronic devices provide sound to the listener.

Block 310 makes a determination whether a switch will occur or is occurring.

If the answer to this determination is "no" then flow proceeds to block 300 and the sound continues to play to the listener as the binaural, stereo, or mono sound.

If the answer to this determination is "yes" then flow proceeds to block 320 that states provide a warning of the switch to the listener.

An example embodiment provides the listener with a warning before sound switches and/or while sound is switching. This warning can be a visual warning (e.g., display a notification on a display) or an audio warning (e.g., generate a sound that signifies the switch will occur). In this way, the listener knows of the change to sound in advance of the switching or while the switching occurs.

Consider an example in which an electronic device displays a visual warning to the listener when the SLP in the field-of-view of the listener moves to a perimeter of the field-of-view of the listener. This visual warning notifies the listener of the switching of the binaural sound to the stereo sound and activates when the SLP is near or at the perimeter (e.g., activate the warning when the SLP touches the perimeter).

An example embodiment notifies the listener of the location and/or direction of the SLP and/or graphical representation accompanying the SLP. For example, the display displays a visual indication that points to or provides a location to the SLP. This visual indication can appear on or near the perimeter of the field-of-view. For instance, an arrow or other pointing symbol located hear the perimeters points to a direction or location of the SLP. In this way, the listener knows which way to turn his or her head so the SLP appears in the FOV. As another example, the display displays a light along a perimeter of the display to inform the listener of the SLP when the SLP is outside the field-of-view of the listener. When the listener moves his or her head in the direction of the light, the SLP appears or reappears in the FOV (e.g., the image reappears in the display).

Figure 4:
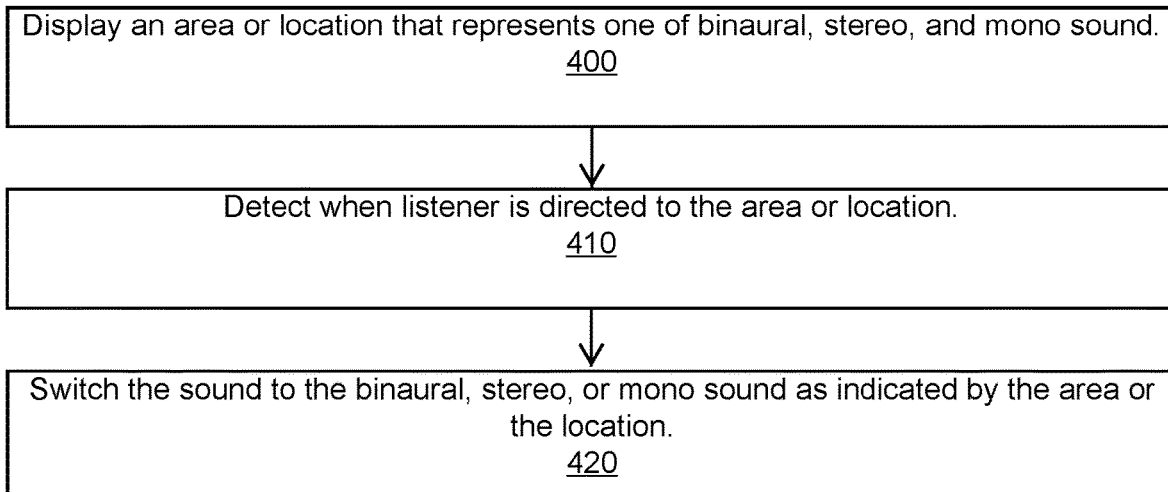
FIG. 4 is a method that switches sound based on a direction of gaze of the listener in accordance with an example embodiment.

FIG. 4 is a method that switches sound based on a direction of gaze of the listener in accordance with an example embodiment.

Block 400 states display an area or location that represents one of binaural, stereo, and mono sound.

The display of the electronic device provides a visual indication of one or more different areas or locations that represent different formats for hearing the sound. For example, binaural sound appears at one location; stereo sound appears at a second location; and mono sound appears at a third location. These locations can be simultaneously displayed to enable the listener to select the format for hearing the sound. These locations can also be or include images, graphical representations, icons, etc.

Block 410 states detect when a listener is directed to the area or the location.

For example, head tracking or gaze tracking detects when a listener is looking at one of the areas or locations. As another example, camera and facial recognition determine where the listener is looking. As another example, one or more sensors (e.g., in an Internet of things, IoT environment) detect when the listener moves into the area or location. For example, the area occurs at specific coordinates in a room or at a specific object, such as occurring at a sofa or chair. As yet another example, the listener moves to or otherwise selects a VR or AR location or object that represents one of binaural, stereo, or mono sound.

Block 420 states switch the sound to the binaural, stereo, or mono sound as indicated by the area or the location.

Sound switches to the format per the area or location upon detecting that the listener is looking to this area or location. For example, when the listener moves his or her head to the area representing binaural sound, then switch the sound be played to the listener to binaural sound. When the listener moves his or her head to the area representing stereo sound, then switch the sound be played to the listener to stereo sound.

Consider an example embodiment that facilitates easy and convenient switching between different formats of sound that the listener hears. The listener interacts with the user interface and switches how he or she hears the sound based on head movements or eye gaze. Looking in a particular direction or at a particular location or area being displayed activates or deactivates the format of sound. In this way, the listener can change the format of sound via a hands-free operation.

Consider an example in which the listener wears an HMD or AR glasses that provide 3D sound. When the listener speaks the word "sound" to a natural language user interface, a left side of the FOV on the display shows binaural sound and right side of the FOV shows stereo sound. In order to select one of these formats, the listener merely needs to look in the direction of the desired format. Thus, looking left selects binaural sound, and looking right selects stereo sound.

Consider an example in which the listener is playing a VR or AR game in which the sounds localize as binaural sound. A relatively small area of the displayed area or FOV shows or represents stereo sound. The listener can switch the format of sound from binaural to stereo by moving and orientating his or her head to be directed at this small area. For instance, head tracking detects when a head of the listener is directed to the area that represents the stereo sound. The VR or AR game automatically switches the sound to stereo upon detecting the head of the listener is directed to the area that represents the stereo sound. In this way, the listener can quickly change the format of sound while continuing to hear the sound and while continuing to play the VR or AR game.

Consider an example in which the wearable electronic device displays an area in the field-of-view that represents one or more of binaural and stereo sound. The electronic device tracks the head movements of the listener to determine when a line-of-sight of the listener is directed to the area in the field-of-view that represents the stereo sound. When this event occurs, the electronic device changes the sound from playing in the binaural sound to playing in stereo sound.

The area of location to change sound can also be outside the FOV of the listener. Consider an example in which the area or location to change sound is not displayed. The user interacts with the electronic device and provides a command or instruction for viewing the format of sound or changing the format of sound. In response to this command or instruction, the electronic device displays one or more of an area, location, or option for binaural sound and stereo sound. The user selects the area, location, or option by looking at the desired format of sound.

The listener can select the format of sound in other ways as well. Consider an example in which the user plays an AR or VR game that includes shooting objects with a gun. The game provides the sounds in stereo. A perimeter of the displayed area or FOV displays a "3D" indication. This indication represents 3D sound or binaural sound. When the user points and shoots the gun to this indication, the sound switches from playing as stereo sound to playing as 3D or binaural sound. The perimeter of the displayed area or FOV then displays a "stereo" indication. When the user points and shoots the gun to this indication, the sound switches from playing as binaural sound to playing as stereo sound.

Consider further this example in which the listener is a player in the AR or VR game in which one object of the game is to obtain gold coins. One gold coin signifies achieving or winning 3D sound. When the listener runs to or thru the gold coin, sound switches to 3D sound.

This example of an AR or VR game shows that the user is able to switch the format of sound without disrupting the game or switching sound occurs as part of the game. The user interface for switching sound appears in the game itself. As such, the user can select how the sound is provided while continuing to enjoy the game.

Instead of shooting at the visual indication, the user can select the format in other ways depending on the game (e.g., throwing an object at the indication, hitting the indication, shooting an arrow or other projectile at the indication, etc.).

Figure 5:
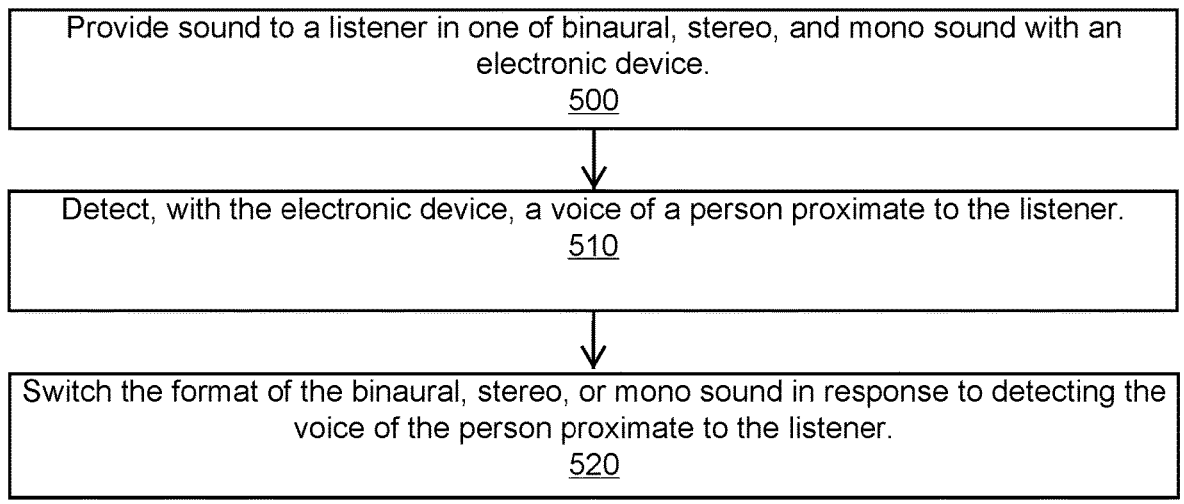
FIG. 5 is a method that switches sound based on detecting a voice in accordance with an example embodiment.

FIG. 5 is a method that switches sound based on detecting a voice in accordance with an example embodiment.

Block 500 states provide sound to a listener in one of binaural, stereo, and mono sound with an electronic device.

As noted, an example embodiment provides sound to the listener thru an electronic device, such as headphones, earphones, HMD, AR glasses, speakers, bone conduction, etc.

Block 510 states detect, with the electronic device, a voice of a person proximate to the listener.

A natural language user interface and/or automatic speech recognition (ASR) of the electronic device detects the voice the person proximate to the listener. For example, the electronic device includes one or more microphones that detect sound.

Block 520 states switch the format of the binaural, stereo, or mono sound in response to detecting the voice of the person proximate to the listener.

The electronic device switches the sound in response to detecting the voice of the person proximate to the listener.

When the listener hears binaural sound, this sound localizes to different locations around the listener. It may be difficult or even impossible for the listener to distinguish between these electronically generated sounds and the voice of a person proximate to the listener. When the electronic device detects the voice of the proximate person, the format of the sound being provided to the listener switches from binaural sound to one of stereo or mono sound. In this way, the listener can distinguish between the electronically generated sounds (which are now in stereo or mono) and the voice of the person.

Consider an example in which the listener wears an HMD while playing a game and hearing binaural sound. The game provides a multitude of different sounds that include voices that originate around the listener in a VR environment. While playing the game, a person proximate to the listener speaks to the listener. The listener may not be able to distinguish whether the voice of the person is coming from a real person near the listener or coming from a character in the VR environment. The HMD includes one or more microphones that detect the voice. Upon making this detection, the HMD automatically switches the sounds to stereo. This switching enables the listener to distinguish the sounds in the game from the sound of the voice of the person. At the same time, the listener is able to continue to play the game uninterrupted while he or she talks to the person.

Figure 6:
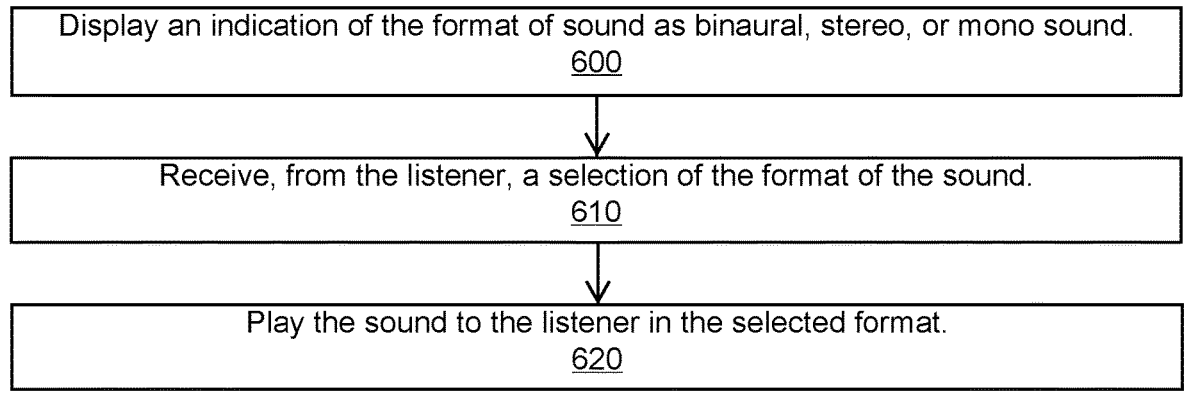
FIG. 6 is a method that enables a listener to switch the format of sound being played in accordance with an example embodiment.

FIG. 6 is a method that enables a listener to switch the format of sound being played in accordance with an example embodiment.

Block 600 states display an indication of the format of sound as binaural, stereo, or mono sound.

An electronic device displays a visual indication that when selected enables the listener to select one or more of binaural, stereo, or mono sound. This visual indication appears on, with, or thru the display. For example, the electronic device displays the visual indication in a FOV of the wearer or user of the electronic device.

Block 610 receives, from the listener, a selection of the format of the sound.

The user or listener interacts with the electronic device to make a selection of the format of the sound. For example, this selection comes from or thru a user interface, such as a voice activated user interface, graphical user interface (GUI), user interface on an HMD or AR glasses, handheld wand or other handheld device, a switch, etc.

Block 620 states play the sound to the listener in the selected format.

The electronic device plays the sound to the listener in the selected format.

Consider an example in which a wearable electronic device (WED) includes or communicates with one or more processors that instructions to display a symbol, graphical representation, or indicia for selecting a format of sound. For example, the WED displays the word "stereo" or the symbol "S" that when selected by the listener changes the sound from playing in the binaural sound to playing in the stereo sound. As another example, the WED displays the word "3D' or other indication that when selected plays the sound in binaural sound or switches to binaural sound.

One example embodiment is an electronic device with a user interface that informs the listener how and/or where sound will play to the listener. For example, a display of the electronic device displays a visual indication and/or graphical representation that informs the listener how and/or where the sound will play. For instance, the listener knows in advance of hearing the sound that it will play as mono sound, stereo sound, or binaural sound. The listener can also know in advance a sound localization point (SLP) or location from where the sound will originate to the listener. In this way, the listener knows the format of how the sound will play and/or location from where it will originate in advance of hearing the sound.

The user interface can also assist the listener in selecting the format for how the sound will play and/or selecting the SLP or location from where the listener will hear the sound. For example, the electronic device displays options to hear the sound as mono sound, stereo sound, or binaural sound and also provides a mechanism wherein the listener can move the SLP or select where the SLP occurs. In this way, the listener can control the location of the sound and the format for how he or she hears it.

Consider an example in which an electronic device displays a graphical representation that plays sound to the listener when activated. Along with the graphical representation, the electronic device also displays options for hearing the sound as mono sound, stereo sound, or binaural sound. Selection of the mono option plays the sound in mono sound; selection of the stereo option plays the sound in stereo sound; and selection of the binaural or 3D option plays the sound in binaural sound.

Consider an example in which the electronic device displays the graphical representation that the provides information to the listener or user. This information includes one or more of where the binaural sound will externally localize or is externally localizing with respect to the listener, a format for how the sound will localize or play to the listener, and options for selecting the format and/or location (SLP) for where or how the sound will play to the listener. This information can be presented in the graphical representation itself and/or in a visual indication or indication along with the graphical representation. In order to select the desired format of sound, the listener activates or selects the graphical representation (e.g., by looking at the graphical representation, shooting the graphical representation, speaking at or to the graphical representation, orientating a head position toward or at the graphical representation, or interacting with a user interface to select the graphical representation).

One or more processors or processing unit can convolve or process sound to provide this sound as 3D sound or binaural sound. For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

For example, a DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound. Other technologies exist as well to provide 3D sound to listeners.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point $(r, \theta, \phi)$) or a general location or area (e.g., localizing to far-field location $(\theta, \phi)$ or near-field location $(\theta, \phi)$). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$(theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates $(r, \theta, \phi)$ for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information can be calculated or extracted from the HRTF data files. A unique set of HRTF information (including r, θ, φ) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively, or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, φ) with discrete Fourier transforms (DFTs) calculated for the left and right ears. The ITD is located at the point for which the function attains its maximum value, known as the argument of the maximum or arg max as follows:

$$ITD = \mathrm{argmax}(\tau) \sum_n d_{l,\theta,\phi}(n) \cdot d_{r,\theta,\phi}(n+\tau).$$

Subsequent sounds are filtered with the left HRTF, right HRTF, and/or ITD so that the sound localizes at (r, θ, φ). Such sounds include filtering stereo and monaural sound to localize at (r, θ, φ). For example, given an input signal as a monaural sound signal s(n), this sound is convolved to appear at (θ, φ) when the left ear is presented with:

$$s_l(n) = s(n-ITD) \cdot d_{l,\theta,\phi}(n);$$

and the right ear is presented with:

$$s_r(n) = s(n) \cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau-t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is pre-processed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

As noted herein, a user or listener can activate and/or switch the format of sound using a variety of different methods and apparatus. For instance, the user clicks on the graphical representation, issues a voice command to play the sound or activate the graphical representation, uses a mouse or pointer to activate or play the sound, commands or instructs a software program to activate or play the sound, issues body gesture (e.g., hand gesture, eye movement, etc.), etc. Activation or playing of the sound can occur in other ways as well. For example, the sound plays when the second person views the graphical representation, opens or enlarges a window, or opens a software program. For example, the sound plays upon occurrence of another event, such as playing at a certain time of day, playing when the user proceeds to a geographical or internet of things (IoT) location, the user enters a virtual space, the user focuses a window, the user dons a PED, the user activates a program, the user turns on or awakes from sleep an electronic device, or other events discussed herein.

The HRTFs can be generic HRTFs, customized HRTFs, or HRTFs that are customized to the listener. Customized HRTFs or HRTFs that are customized to the listener are specific to an anatomy of a particular listener and are based on a size and/or shape of the head and/or ears of the listener. Customized HRTFs can be obtained from actual measurements (e.g., measuring HRIRs and/or BRIRs from a head of the user) or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge. One or more example embodiments expedite playing of sound to a user by prefetching, decrypting, and/or caching the sound before the sound is played to the listener in accordance with an example embodiment.

For example, an electronic device receives or obtains the sound from local memory (e.g., memory on the electronic device), local storage (e.g., memory directly attached to the electronic device), remote storage (e.g., memory accessed over the Ethernet or wireless network), a server, a database, a data center, etc.

When sound is already convolved into binaural sound, this sound can be converted back into mono or stereo sound or played as mono or stereo sound. For example, the electronic device plays the sound through a single speaker. As another example, the electronic device plays the same channel through both speakers (e.g., play the left channel sound to both the left and right speakers of the headphones or play the right channel sound to both the left and right speakers of the headphones). As another example, the sound is filtered through cross-talk canceling filters. Filters, for example, can eliminate crosstalk and the HRTFs (e.g., by utilizing an inverse filter, such as a Nelson/Kirkeby inverse filter).

Figure 7A:
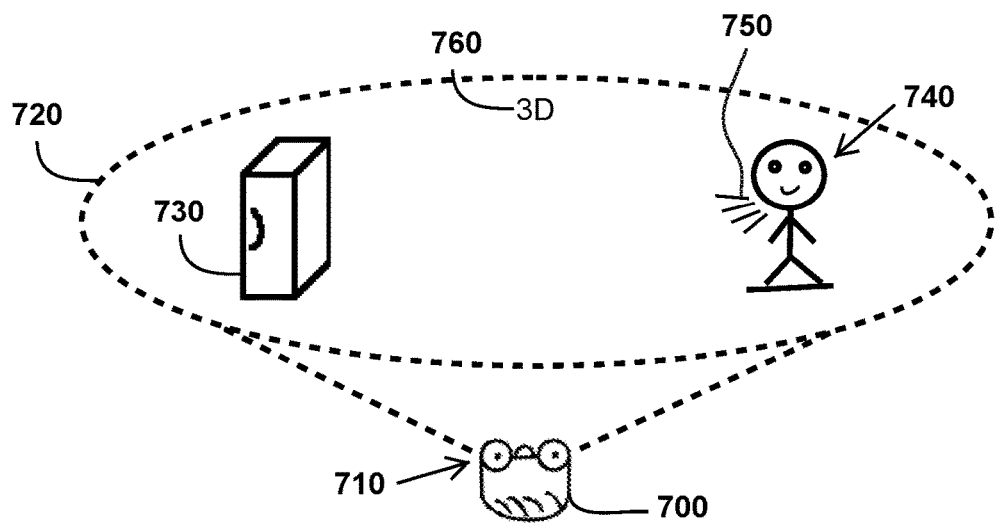
FIG. 7A shows switching the format of sound when an object moves out of a field of view of a listener in accordance with an example embodiment.
Figure 7B:
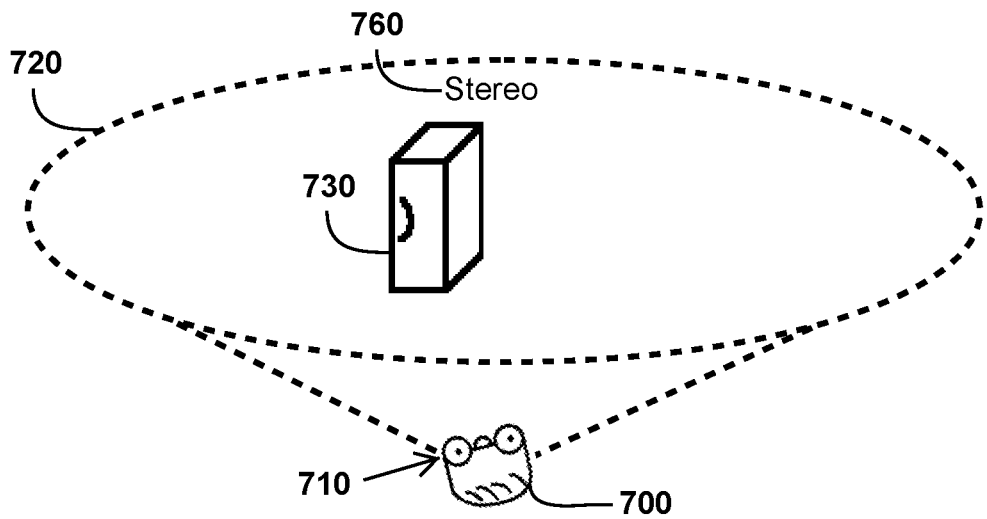
FIG. 7B shows switching the format of sound when an object moves out of a field of view of a listener in accordance with an example embodiment.

FIGS. 7A-7B show switching the format of sound when an object moves out of a field of view of a listener in accordance with an example embodiment.

A listener 700 wears a wearable electronic device (WED) 710 and has a field of view 720 that includes several objects, shown by way of example as a cabinet 730 and a person 740. The person 740 is a graphical representation, such as an AR or VR image provided by the wearable electronic device 710.

While the person 740 is in the field of view 720, the listener hears a voice 750 of the person as binaural or 3D sound that has a SLP originating from the AR or VR image. A display of the WED includes a visual designation 760 of binaural sound, shown as "3D". This designation shows the listener that sounds he or she hears are electronically generated binaural sound.

As shown in FIG. 7B, the head of the listener 700 rotated to the listener's left in a horizontal or azimuth direction. This movement caused the cabinet 730 to move toward a center of the field of view 720, but also caused the person 740 to move outside the field of view. For example, the person may still be present in the AR or VR environment of the listener but is no longer visible to the listener. In response to this movement, the voice 750 of the person switches from being provided to the listener as binaural sound to being provided to the listener as stereo sound. As such, the voice of the person now localizes inside the head of the listener (e.g., the WED includes or is in communication with headphones or earphones that the listener wears). In response to this switching, the visual designation 760 changes to show sound being provided to the listener in stereo, shown as "stereo". If the listener were to move his or her head back to the position shown in FIG. 7A, then the sound would switch back to binaural sound, and the visual designation 760 would change back to "3D" to inform the listener of this change.

The visual designation 760 provides the listener with a visual cue or visual indication of the switching of sound to different formats and also shows the listener the current format for the sound. This switching and change in visual designation can occur when the head orientation moves and causes the SLP (e.g., person 740) to move outside the field of view and/or when the SLP moves outside the field of view.

Figure 8A:
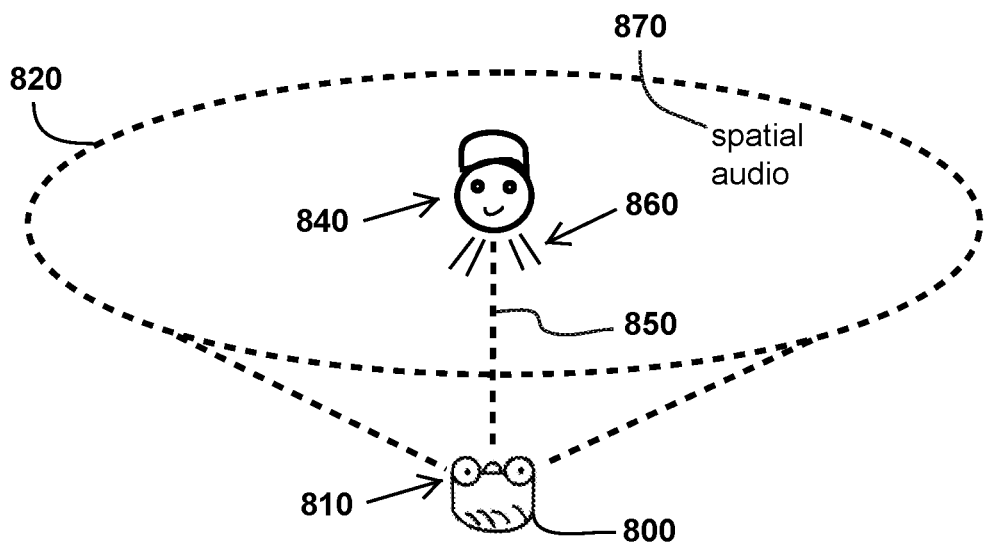
FIG. 8A shows switching the format of sound when an object moves a predetermined amount in a field of view of a listener in accordance with an example embodiment.
Figure 8B:
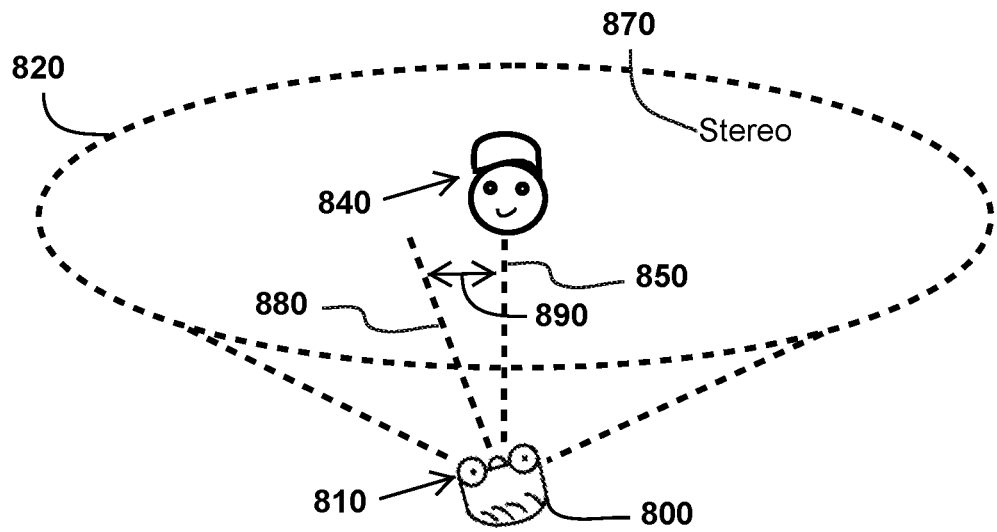
FIG. 8B shows switching the format of sound when an object moves a predetermined amount in a field of view of a listener in accordance with an example embodiment.

FIGS. 8A-8B show switching the format of sound when an object moves a predetermined amount in a field of view of a listener in accordance with an example embodiment.

A listener 800 wears a wearable electronic device (WED) 810 and has a field of view 820 that includes a person 840 that is communicating with the listener. By way of example, the person is a graphical representation, such as an AR or VR image provided by the wearable electronic device 810. For instance, two individuals communicate during a telephone call or an electronic call.

FIG. 8A shows the person 840 being along a line of sight 850 that is directly in front of the listener such that a forward-looking direction of the listener is directed to the person. While the person 840 is in this position in the field of view 820, the listener hears a voice 860 of the person as binaural or 3D sound that has a SLP originating from the person (e.g., emanating from the AR or VR image that the listener sees). A display of the WED includes a visual designation 870 of binaural sound, shown as "spatial audio". This designation shows the listener that the voice he or she hears from the person 840 is electronically generated binaural or 3D sound.

As shown in FIG. 8B, the head of the listener 800 rotated to the listener's left in a horizontal or azimuth direction. This movement caused the listener to have a new or different line of sight 880. An amount of this movement is shown at 890 and represents an amount of horizontal movement or change in azimuth angle of the head of the listener. For example, this change in azimuth angle is the angular difference between line of sight 850 and line of sight 880. Visual indication 870 indicates the sound being provided to the listener is provided in stereo sound. Here, the listener hears the voice of the person 840 in stereo, and the display provides this visual indication to the listener.

When head movements of the listener change by a predetermined amount, then the format of sound switches as indicated herein. These amounts can be preset or predetermined for azimuth, elevation, or an axis of head rotation (e.g., yaw, pitch, roll of the head). For example, when the azimuth angle and/or elevation angle of the head of the listener changes by a predetermined amount, then switch the sound. Examples of these angles include, but are not limited to, one or more of 30°, 35°, 40°, 45°, 50°, 55°, 60°, 65°, . . . 180°. This switching of sound can occur even while the person (or image) is still in the field of view of the listener.

Consider an example in which the listener 800 talks to person 840 and hears a voice of the person in 3D sound as indicated in FIG. 8A. While the line of sight 850 of the listener 800 remains fixed, the person 840 moves 70° azimuth with respect to the listener and line of sight. At this position, the person is still in a peripheral area of the field of view of the listener but not in an ideal area of the field of view for the conversation. A default is set such that when the SLP moves more than 69° azimuth with respect to the line of sight of the listener, then a switch occurs from binaural sound to stereo sound. Since the person moved 70° azimuth (which is more than the default azimuth amount), a switch occurs to the format of the sound. When the listener or the SLP moves back into a more ideal area of the field of view (in this example, 69° azimuth or less), the sound switches back to binaural sound.

Figure 9A:
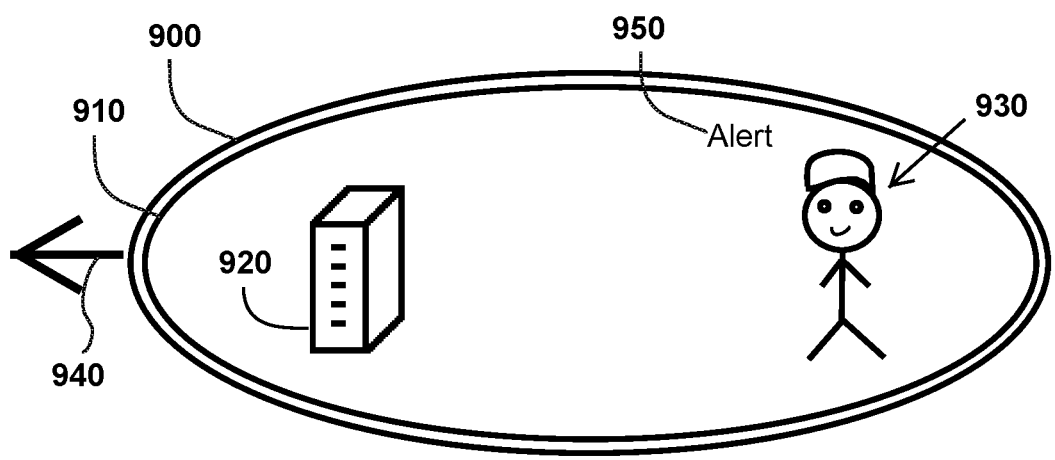
FIG. 9A shows an electronic device that provides an alert when a sound localization point (SLP) moves to a periphery of the field of view of the listener in accordance with an example embodiment.
Figure 9B:
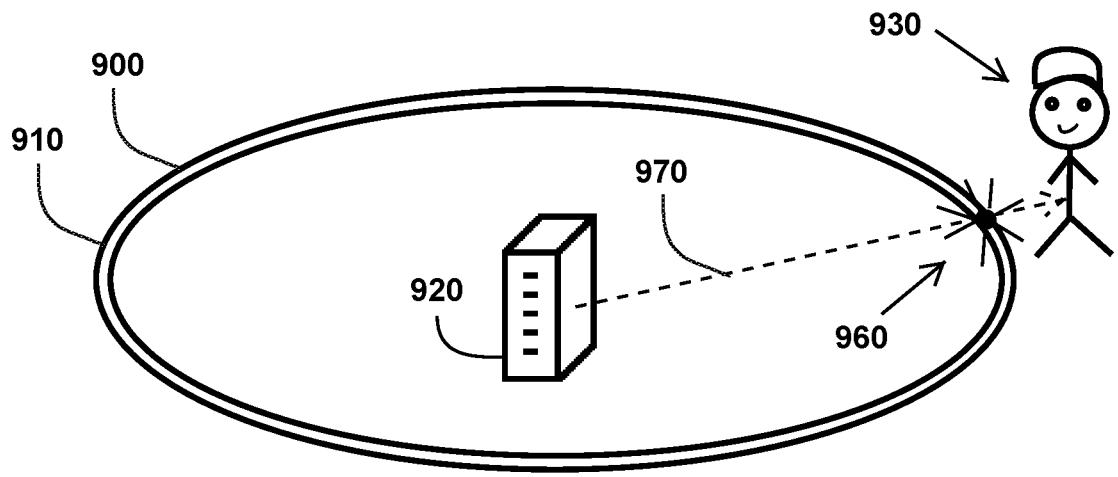
FIG. 9B shows an electronic device that provides an alert when a sound localization point (SLP) moves to a periphery of the field of view of the listener in accordance with an example embodiment.

FIGS. 9A and 9B show an electronic device that provides an alert when a sound localization point (SLP) moves to a periphery of the field of view of the listener in accordance with an example embodiment.

An electronic device 900 includes a display 910 that displays or provides objects, such as images, video, AR and/or VR graphical representations, etc. For illustration, the display 910 shows a field of view that includes a cabinet 920 and a person 930.

FIG. 9A shows the electronic device 900 moving to the left, as shown with arrow 940. As such, objects viewable in, on, or thru the display move to the right with respect to the field of view of the display. When the electronic device 900 rotates sufficiently to the left in the direction of arrow 940, the person 930 is no longer visible in, on, or thru the display as shown in FIG. 9B.

When the person 930 is at or near a periphery or edge of the display, an alert 950 occurs. For example, the display 910 displays an alert or warning that visually notifies the user that the person 930 is about to move outside the field of view of the display. This alert can include a visual alert and/or an audio alert. For example, the electronic device provides the listener with one or more beeps. These beeps can be in stereo sound. Alternatively, these beeps can externally localize as binaural sound to the location of the person 930. This audio alert informs the listener to which object the alert is being directed because the sound emanates from the object itself.

FIG. 9B shows the situation after the person 930 moved outside the field of view of the display 910. When this occurs, the user may no longer know where the object exists relative to the display since the object (here, a person 930) is no longer visible. In response to this occurrence, the display 910 provides a visual indication 960 notifying the user that the person 930 is outside the field of view of the display.

The visual indication 960 can provide location information that includes a direction of where the object (here a person 930) exists outside of the field of view of the display. As shown in FIG. 9B, the light blinks or occurs on the edge or periphery of the display at a location that shows the user where to look or where to move the display to recapture the person 930. When the user moves his or her head and/or electronic device in the direction of imaginary line 970, the person 930 will reappear in the display. A position of the alert or visual indication 960 on or near the outer circumference or edge of the display shows the user the direction of the hidden or unseen person. For example, as shown in FIG. 9B, movement of the display to the right and slightly upward will recapture the image of the person.

The position of the visual indication 960 can appear in other locations of the display to indicate the location of the corresponding hidden object. For example, if the visual indication appeared at the top of the display, then this position would indicate to the user that the object is above the display. If the visual indication appeared at the bottom of the display, then this position would indicate to the user that the object is below the display.

The display can simultaneously display multiple visual indications to indicate locations of multiple sources of sound (e.g., multiple SLPs) that are out of the current field of view. In this way, the user can track locations of multiple objects that are no longer visible but may or may not be generating sound.

Figure 10A:
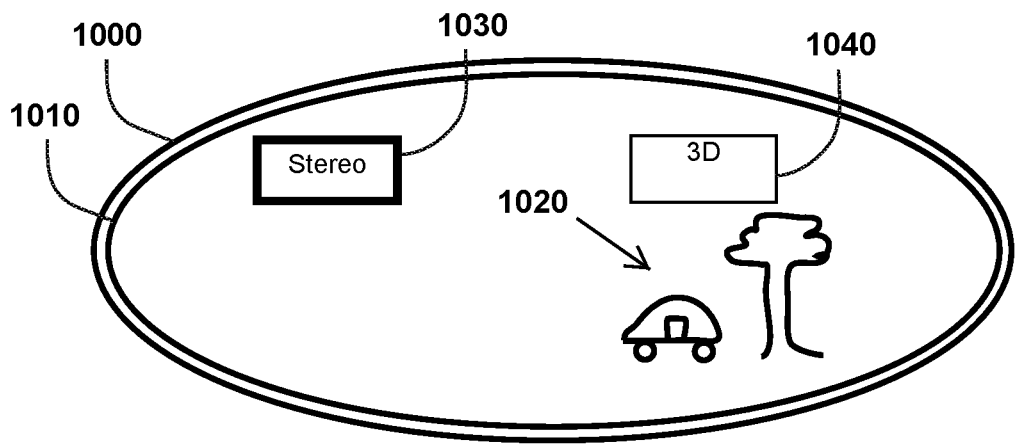
FIG. 10A shows an electronic device that provides switching between binaural and stereo sound in accordance with an example embodiment.
Figure 10B:
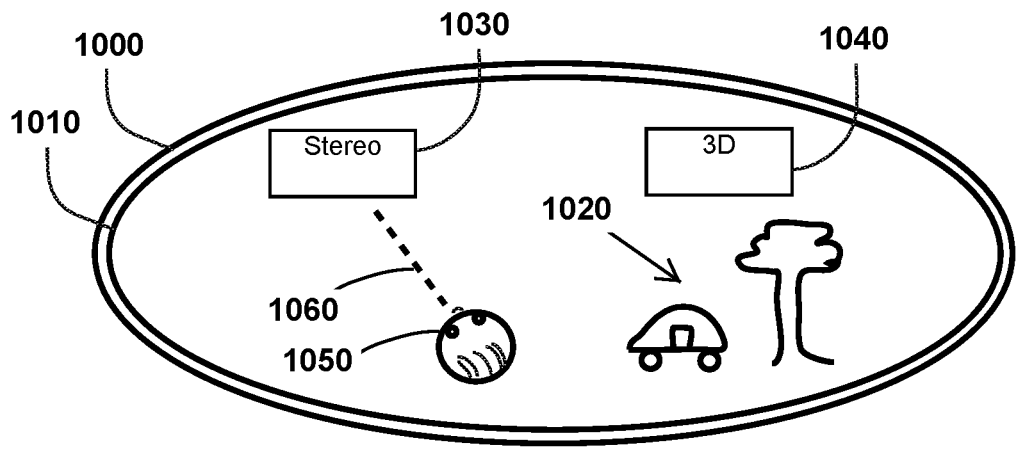
FIG. 10B shows an electronic device that provides switching between binaural and stereo sound in accordance with an example embodiment.
Figure 10C:
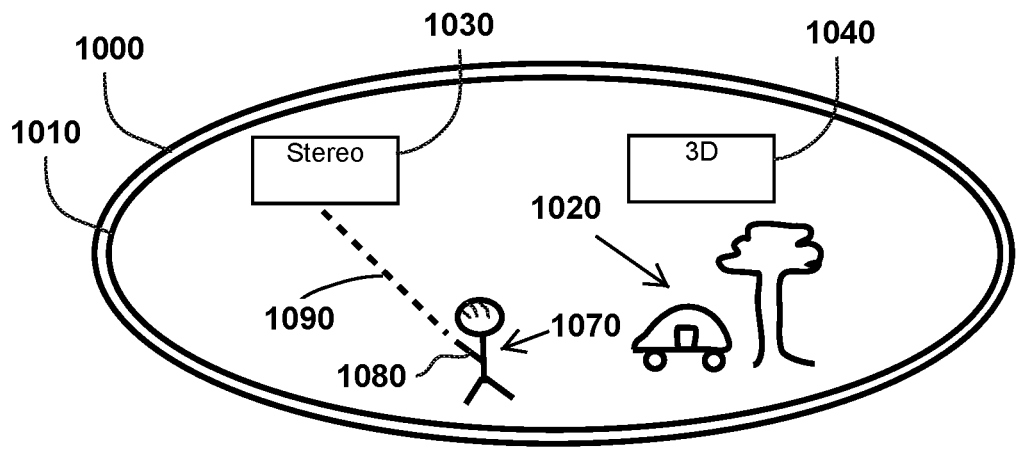
FIG. 10C shows an electronic device that provides switching between binaural and stereo sound in accordance with an example embodiment.

FIGS. 10A-10C show an electronic device that provides switching between binaural and stereo sound in accordance with an example embodiment.

The electronic device 1000 includes a display 1010 that displays or provides one or more objects 1020, such as images, video, AR and/or VR graphical representations, etc.

Objects shown on, with, or thru the display can be real, such as objects captured with a camera of the electronic device or objects seen thru the display (e.g., when the display forms part of electronic glasses). These objects can also be electronically generated and provided on or with the display (e.g., objects in VR or AR). Such objects can also be a mix of real and electronically generated (e.g., an AR image overlaid on a real object).

The display 1010 also includes different areas, zones, points, locations, graphical representations, images, etc. that designate different formats of sound. For illustration, these are shown as areas 1030 and 1040. Area 1030 corresponds to stereo sound, and area 1040 corresponds to 3D or binaural sound. Area 1030 is bolded or highlighted as compared to area 1040 to visually indicate that stereo sound is selected and the current format for how sound is provided to the listener.

The area provides a mechanism thru which a user can select the format of sound designated per the area. For example, a user interacts with the area as part of a user interface to select the format corresponding to the area. For illustration, display 1010 designates area 1030 as having a format of stereo sound and area 1040 as having a format of 3D sound. Selection of area 1030 provides the sound to the listener in stereo sound, and selection of area 1040 provides the sound to the listener in 3D or binaural sound.

Users can interact with the electronic device 1000 and/or display 1010 in a variety of ways to select the format of sound, such as pointing to the area, clicking on the area, gesturing to the area, speaking a command or instruction to select the area, looking at the area, interacting with a handheld portable electronic device to select the area, and performing other actions per a user interface.

Example embodiments include method and apparatus that enable the user to select the format of sound while playing a software game or executing a software application (e.g., a mobile messaging application). The user can select or change the format of sound without interrupting execution of the game or application.

Consider an example embodiment shown in FIG. 10B in which the display 1010 includes an image that represents the listener, user, or player 1050. For example, the image 1050 represents the head of the listener and moves in unison with or corresponding to head movements of the listener. When the head of the listener moves to the right, the head of the image 1050 moves to the right.

Per FIG. 10B, the listener can select or change a format of sound with a line of sight 1060. For example, when the head of the listener and hence head of image 1050 has a line of sight directed to the area 1030, then the electronic device selects stereo sound as the format.

Consider an example in which the listener (via an avatar or other graphical representation) navigates thru an AR or VR world. This world includes designated areas or zones 1030 and 1040 that enable the listener to change the format of sound while navigating the world. For example, such areas display or appear periodically, continuously, continually, randomly, upon a command or instruction from the listener, or upon an action occurring in the world in which the listener navigates. When the listener and hence image 1050 looks at the area, the electronic device provides the sound in the world to the listener in the format of the selected area. In this way, the listener can easily select or change the format of sound (e.g., look or stare at the designated area). Alternatively, the listener can ignore the area and proceed thru the world.

Consider an example embodiment shown in FIG. 10C in which the display 1010 includes an image that represents the listener, user, or player 1070. For example, the image 1070 is a person that the listener controls with interaction of the electronic device 1000.

Per FIG. 10C, the listener can select or change a format of sound by shooting a gun or weapon 1080 to the area. When the weapon 1080 targets or fires 1090 at area 1030, then the listener selects stereo sound. Firing at the area 1040 selects 3D or binaural sound.

Consider an example in which the listener (via an avatar or other graphical representation) plays an AR or VR software game in which the listener or user is or controls image 1080. For example, the listener can compete with or play with other players that appear in the game. While playing the game, the display shows images, areas, icons, graphical representations, etc. that represent the format of sound (e.g., areas 1030 and 1040). In order to select or change a format of sound, the listener wires the weapon at the selected format. In this way, the listener can easily select or change the format of sound (e.g., firing a weapon at the designated area) while playing the game. Alternatively, the listener can ignore the area while continuing to play the game in an uninterrupted way.

Selection of the format of sound per FIGS. 10B and 10C differs from conventional approaches that would require, for example, the listener to navigate thru a series of dropdown menus or other UI selections in order to select the format of sound. For example, the listener would have to select "settings" and then "sound" and then "3D sound" if the listener wanted to hear binaural sound. By contrast, FIGS. 10B and 10C show examples in which the listener can make such selections or changes while continuing to play the game or software application without interrupting play.

Figure 11A:
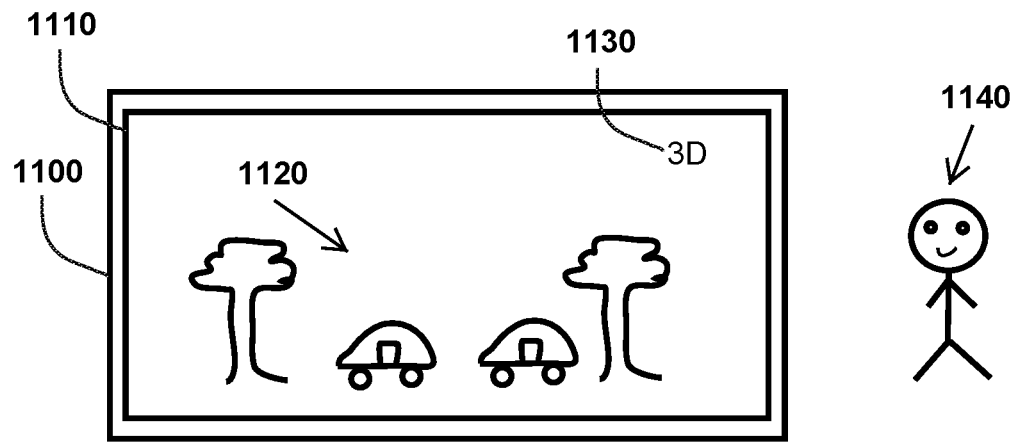
FIG. 11A shows an electronic device that provides switching between binaural and stereo sound based a presence or voice of a third person in accordance with an example embodiment.
Figure 11B:
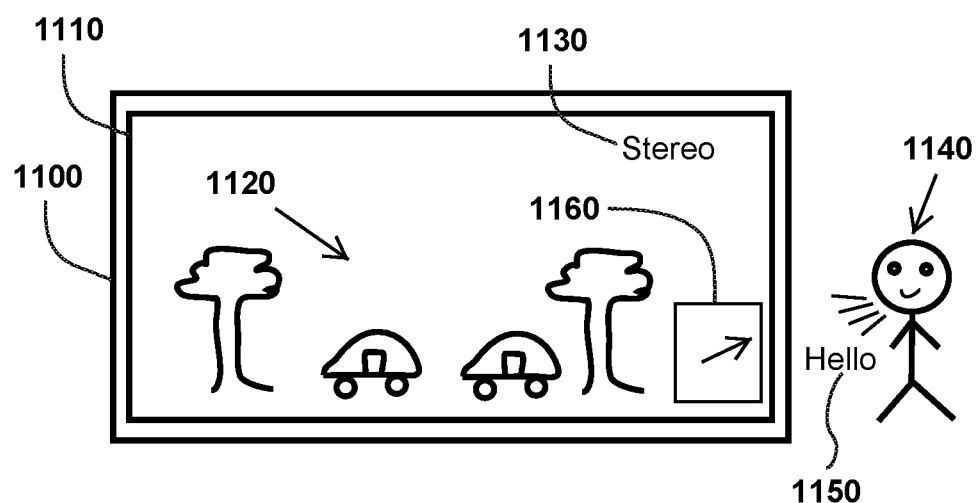
FIG. 11B shows an electronic device that provides switching between binaural and stereo sound based a presence or voice of a third person in accordance with an example embodiment.

FIGS. 11A-11B show an electronic device that provides switching between binaural and stereo sound based a presence or voice of a third person in accordance with an example embodiment.

The electronic device 1100 includes a display 1110 that displays or provides one or more objects 1120, such as images, video, AR and/or VR graphical representations, etc. The display 1110 also provides or displays a visual indication 1130 that shows the format of sound. FIG. 11A shows the visual indication showing the format of sound being in stereo, and FIG. 11B shows the visual indication showing the format of sound being in 3D.

Sound switches format based on the presence of a third person 1140 and/or presence of a voice 1150 of the third person. As one example, when the third person 1140 physically comes within a predefined or predetermined distance to the listener and/or electronic device 1100, sound switches. For instance, switch sound when the third person 1140 comes with 1.0 meter of the listener, 1.5 meters of the listener, or 2.0 meters of the listener. As another example, sound switches when the third person 1140 speaks. For instance, FIG. 11B shows the third person 1140 speaking the word "Hello" which would cause the sound being provided to the listener to switch from 3D sound to stereo sound.

Consider an example embodiment of FIG. 11A in which the listener navigates thru a VR world while wearing a head mounted display (HMD) 1100. The listener is not aware or unable to see real people around or proximate to the listener. Sensors on the HMD detect motion, movement, or presence of other people when such people come within a predetermined distance of the listener while the listener dons the HMD. For example, when third person 1140 comes within one to two meters of the listener, then sound automatically switches from 3D to stereo. This switching performs several functions. First, the switching signifies to the listener that someone is physically approaching or is near. Second, the switching assists the listener in hearing the third person or knowing that this person is a real person, as opposed to a person or sound originating in the VR environment.

Consider an example embodiment of FIG. 11B in which the listener navigates thru a VR world while wearing a head mounted display (HMD) 1100. The listener is not aware or unable to see real people around or proximate to the listener. A microphone on the HMD detects sound in the physical environment of the listener while the listener dons the HMD. For example, the third person 1140 speaks "Hello" to the listener (as indicated at 1150). Upon detecting the voice and/or detecting a keyword, the electronic device automatically switches the sound from 3D to stereo. This switching performs several functions. First, the switching signifies to the listener that someone is talking (e.g., talking to the listener). Second, the switching assists the listener in distinguishing the voice of the third person from voices or sounds in the VR environment. If the sound did not switch, the listener would have difficulty talking to the third person since the listener could become confused about whether the voice originated in the real world or the VR world.

FIG. 11B includes a visual indication 1160 that shows a direction and/or location of the third person 1140 and/or voice 1150. For example, the visual indication is an arrow that points to where the third person is located or where the voice originated. The visual indication can also be provided at location on the display that provides the direction or location information. For instance, the electronic device displays the visual indication on a right side of the FOV or display when the location of the person and/or voice is to a right side of the listener.

Figure 12:
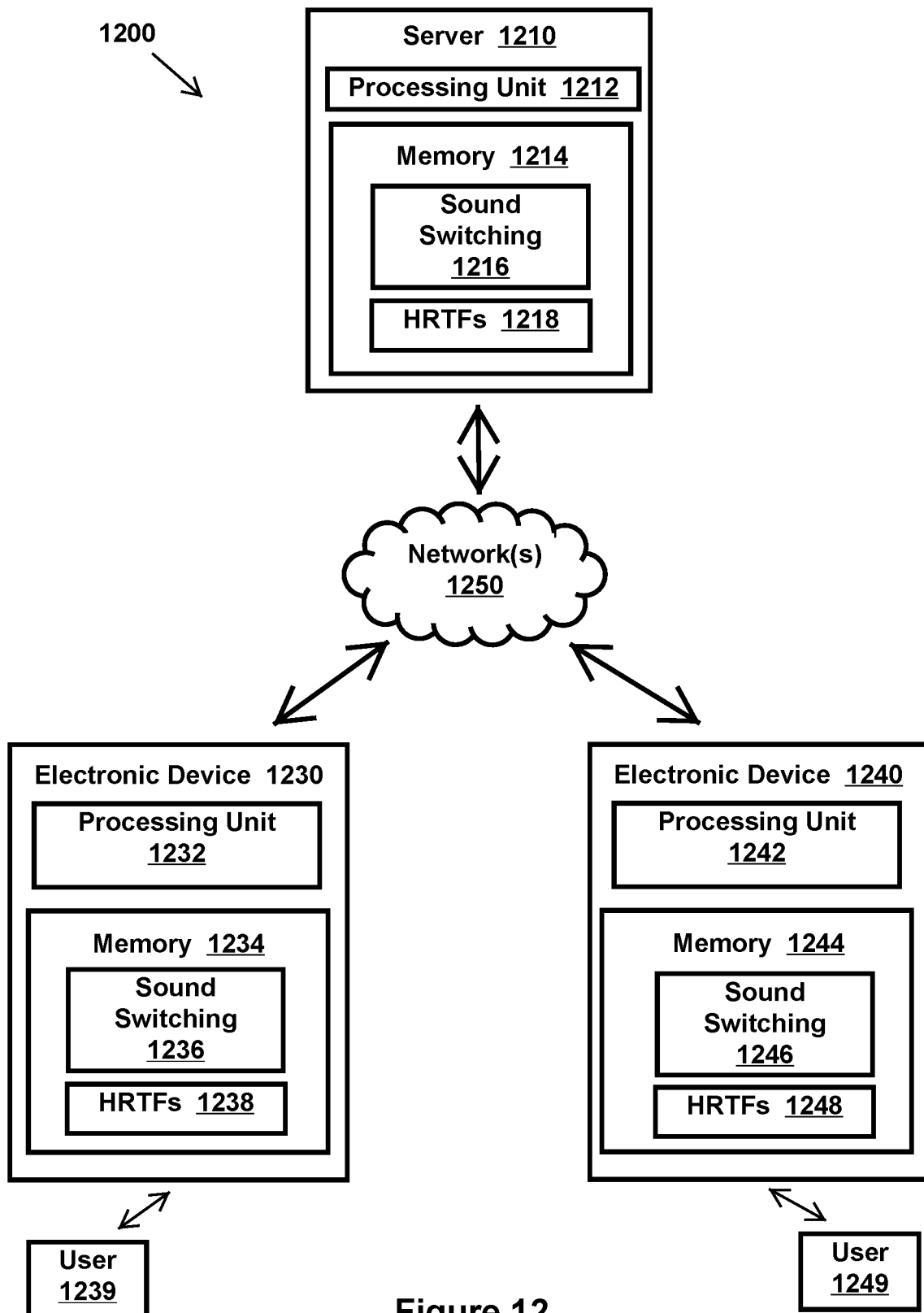
FIG. 12 is an example computer system in accordance with an example embodiment.

FIG. 12 is an example computer system 1200 in accordance with an example embodiment.

The computer system 1200 includes one or more of a server 1210, an electronic device 1230, and an electronic device 1240 in communication over one or more networks 1250. User 1239 is with or uses electronic device 1230, and user 1249 is with or uses electronic device 1240. For illustration, a single server 1210, two electronic devices 1230 and 1240, and two users 1239 and 1249 are shown, but example embodiments can include one or more of a server, electronic device, and user.

Server 1210 includes a processing unit 1212 and memory 1214. The memory includes sound switching 1216 (e.g., software and/or hardware to execute examples embodiments that switch and/or change a format of sound as discussed herein) and HRTFs 1218.

Electronic device 1230 includes a processing unit 1232 and memory 1234 with sound switching 1236 and HRTFs 1238.

Electronic device 1240 includes a processing unit 1242 and memory 1244 with sound switching 1246 and HRTFs 1248.

Sound switching can occur in the server, in one of the electronic devices, or in combinations of these devices.

Figure 13:
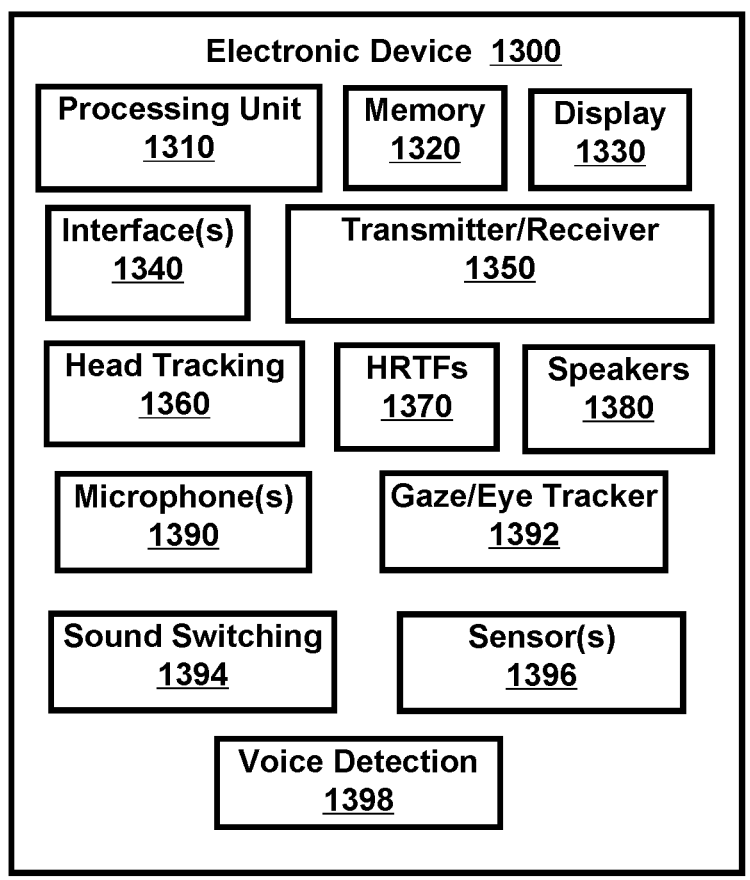
FIG. 13 is an example of an electronic device in accordance with an example embodiment.

FIG. 13 is an example of an electronic device 1300 in accordance with an example embodiment.

The electronic device 1300 includes a processor or processing unit 1310, memory 1320, a display 1330, one or more interfaces 1340, a wireless transmitter/receiver 1350, head tracking 1360 (such as one or more of an inertial sensor, accelerometer, gyroscope, and magnetometer), HRTFs 1370, speakers 1380, one or more microphones 1390, gaze and/or eye tracker 1392, sound switching 1394, one or more sensors 1396 (such as one or more of a proximity sensor, infrared sensor, and camera), and a voice detection and/or voice recognition 1398.

Memory includes computer readable medium (CRM).

Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store the sound, graphical representations, and other information and instructions discussed herein (e.g., sound switching).

The electronic device provides sound to the users through one or more speakers. Alternatively, or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, and/or a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments (e.g., switching and/or changing a format of sound).

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

As used herein, "empty space" is a location that is not occupied by a tangible object.

As used herein, "field-of-view" or "FOV" is the observable area a person can see with his or her eyes or via an optical device.

As used herein, "graphical representations" include, but are not limited to, emoji, emoticons, animoji, icons, stickers, folders, documents, files, text or words, pictures, pictograms, ideograms, holograms, images, and other visible indicia that display on, thru, or with an electronic device. Furthermore, these graphical representations can be two-dimensional (2D), three-dimensional (3D), virtual reality (VR) images, augmented reality (AR) images, static or non-moving, moving, and other types of images.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, "sound localization information" or "SLI" is information that is used to process or convolve sound so the sound externally localizes as binaural sound to a listener.

As used herein, a "telephone call," or a "electronic call" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method executed by one or more electronic devices, the method comprising:
   providing, with the one or more electronic devices and to a listener, binaural sound of a voice of a person that externally localizes to the listener at a sound localization point (SLP) that occurs in empty space in a field-of-view of the listener;

tracking, with the one or more electronic devices, head movements of the listener to detect when the SLP moves outside the field-of-view of the listener; and displaying, with the one or more electronic devices worn on a head of the listener and in response to the SLP moving outside the field-of-view, a visual indication that points to a location of where the SLP is located outside the field-of-view.

2. The method of claim 1 further comprising:
switching, in response to the SLP moving outside the field-of-view, the binaural sound to stereo sound while the listener continues to hear the voice of the person.

3. The method of claim 1 further comprising:
tracking, with the one or more electronic devices, the head movements of the listener to detect when the SLP moves back inside the field-of-view of the listener; and
removing the visual indication from being displayed in response to the SLP moving back inside the field-of-view of the listener.

4. The method of claim 1, wherein the visual indication displays at a perimeter of the field-of-view of the listener on a display of a wearable electronic worn on the head of the listener, and the visual indication includes an arrow that points to the location where the SLP is located outside the field-of-view.

5. The method of claim 1 further comprising:
reducing a volume of the voice of the person in response to detecting that the head movements of the listener caused the SLP to move outside the field-of-view of the listener.

6. The method of claim 1 further comprising:
detecting, with the one or more electronic devices worn on the head of the listener, closure of eyes of the listener; and
switching, upon detecting the closure of the eyes of the listener, the binaural sound to stereo sound while the listener continues to hear the voice of the person.

7. The method of claim 1 further comprising:
displaying, with the one or more electronic devices worn on the head of the listener, an area that represents stereo sound;
detecting when the head of the listener is directed to the area that represents the stereo sound; and
switching, upon detecting the head of the listener is directed to the area that represents the stereo sound, the binaural sound to the stereo sound.

8. The method of claim 1 further comprising:
displaying, with the one or more electronic devices worn on the head of the listener, an alert that visually notifies the listener that the SLP is about to move outside the field-of-view of the listener.

9. A non-transitory computer-readable storage medium that one or more electronic devices execute as a method comprising:
playing, to a listener, sound as binaural sound that externally localizes to the listener at a sound localization point (SLP) in empty space located in a field-of-view of a display of a wearable electronic device (WED) worn on a head of the listener;
tracking head movements of the listener that determine when the head of the listener moves and causes the SLP to be outside the field-of-view of the display of the WED worn on the head of the listener; and
displaying, with the display of the WED and in response to determining the head movements caused the SLP to be outside the field-of-view of the display, a visual indication that provides a location of where the SLP exists outside the field-of-view of the display.

10. The non-transitory computer-readable storage medium of claim 9 further comprising:
reducing processing of the sound by changing, upon determining that the head movements of the listener caused the SLP to be outside the field-of-view of the listener, the sound from playing in the binaural sound to playing in stereo sound while the listener continues to hear the sound.

11. The non-transitory computer-readable storage medium of claim 9 further comprising:
displaying, with the display of the WED, the visual indication at an outer perimeter of the field-of-view.

12. The non-transitory computer-readable storage medium of claim 9 further comprising:
determining when movement of a coordinate location of the SLP with respect to a line-of-sight exceeds a threshold along an azimuth direction; and
displaying, with the display of the WED and in response to determining the threshold, a warning that indicates the SLP is about to move outside the field-of-view of the display.

13. The non-transitory computer-readable storage medium of claim 9 further comprising:
detecting a voice of a person talking to the listener while the listener wears the WED; and
changing, upon detecting the voice of the person talking to the listener, the sound from playing in the binaural sound to playing in stereo sound.

14. The non-transitory computer-readable storage medium of claim 9 further comprising:
changing the sound from playing in the binaural sound to playing in stereo sound in response to determining that the head of the listener rotated more than a threshold amount in an azimuth direction away from the SLP.

15. The non-transitory computer-readable storage medium of claim 9 further comprising:
tracking, with the WED, a line-of-sight of the listener; and
changing, upon determining that the line-of-sight of the listener is directed to an area in the field-of-view that represents stereo sound, the sound from playing in the binaural sound to playing in the stereo sound.

16. A wearable electronic device (WED) worn on a head of a listener, the WED comprising:
head tracking that tracks head movements of the listener while the WED plays sound to the listener that externally localizes to the listener at a sound localization point (SLP) in empty space located in a field-of-view of the WED; and
one or more processors that execute instructions to determine when the SLP moves outside the field-of-view of the WED and to display, with a display of the WED and in response to determining that the SLP moved outside the field-of-view, a visual indication that shows a direction where the SLP is located outside the field-of-view.

17. The WED of claim 16, wherein the display displays an image of a person at the SLP, and the one or more processors further execute the instructions to determine when the image of the person is no longer being displayed in the field-of-view of the listener and to change the sound from playing in the binaural sound to playing in stereo sound in response to determining the image of person is no longer in the field-of-view.

18. The WED of claim 16, wherein the visual indication is located along a perimeter of the display of the WED.

19. The WED of claim 16, wherein the one or more processors further execute the instructions to detect when a gaze of the listener is directed to an area in the field-of-view of the listener that represents stereo sound and to change the sound from playing in the binaural sound to playing in the stereo sound in response to detecting that the gaze of the listener is directed to the area.

20. The WED of claim 16, wherein the one or more processors further execute the instructions to:
- display, while the sound plays to the listener in the binaural sound, the word "spatial" or a symbol "3D" to notify the listener that the sound is in the binaural sound, and
- display, while the sound plays to the listener in stereo sound, the word "stereo" or a symbol "S" to notify the listener that the sound is in the stereo sound.

* * * * *